United States Patent
Brown, Jr. et al.

(10) Patent No.: US 8,702,877 B2
(45) Date of Patent: Apr. 22, 2014

(54) CATHODE MEMBER AND BIPOLAR PLATE FOR HYPOCHLORITE CELLS

(75) Inventors: Carl W. Brown, Jr., Leroy, OH (US); Richard C. Carlson, Euclid, OH (US); Kenneth L. Hardee, Middlefield, OH (US)

(73) Assignee: Industrie de Nora S.p.A., Milan (IT)

( * ) Notice: Subject to any disclaimer, the term of this patent is extended or adjusted under 35 U.S.C. 154(b) by 203 days.

(21) Appl. No.: 13/072,906

(22) Filed: Mar. 28, 2011

(65) Prior Publication Data

US 2011/0174628 A1    Jul. 21, 2011

Related U.S. Application Data

(63) Continuation of application No. PCT/EP2009/062509, filed on Sep. 28, 2009.

(60) Provisional application No. 61/101,246, filed on Sep. 30, 2008.

(51) Int. Cl.
| | | |
|---|---|---|
| B32B 15/01 | (2006.01) | |
| C23C 14/34 | (2006.01) | |
| C21D 9/00 | (2006.01) | |
| C22F 1/18 | (2006.01) | |
| C23C 28/00 | (2006.01) | |
| B23P 19/00 | (2006.01) | |

(52) U.S. Cl.
USPC ......... 148/516; 148/518; 148/559; 148/668; 148/669; 205/188; 205/189; 29/746

(58) Field of Classification Search
USPC ......... 204/291, 292, 290.01, 290.12, 290.14, 204/254, 268; 29/746; 205/620, 621, 188, 205/189; 148/516, 518, 559, 668, 669
See application file for complete search history.

(56) References Cited

U.S. PATENT DOCUMENTS

| | | | | |
|---|---|---|---|---|
| 3,933,616 A | * | 1/1976 | Beer | 204/290.12 |
| 4,037,031 A | * | 7/1977 | Jacob | 429/149 |
| 4,300,992 A | | 11/1981 | Yoshida et al. | |
| 4,790,946 A | * | 12/1988 | Jansen | 210/748.2 |
| 6,352,625 B1 | | 3/2002 | Andolfatto et al. | |
| 2002/0045073 A1 | * | 4/2002 | Finley | 428/701 |
| 2006/0027628 A1 | * | 2/2006 | Sutherlin et al. | 228/101 |

FOREIGN PATENT DOCUMENTS

| | | | | |
|---|---|---|---|---|
| GB | 1388009 A | * | 6/1978 | C25B 11/02 |
| WO | 95/05597 A1 | | 2/1995 | |

OTHER PUBLICATIONS

International Search Report for Application No. PCT/EP2009/062509 dated Nov. 13, 2009.

* cited by examiner

*Primary Examiner* — Edna Wong
(74) *Attorney, Agent, or Firm* — Lucas & Mercanti, LLP

(57) ABSTRACT

A cathodic member for electrochemical cells used in hypochlorite production comprises a zirconium plate coated with a zirconium oxide layer, which is particularly suitable for minimising the decomposition of the hypochlorite product while ensuring a prolonged lifetime. The coated zirconium plate can be used as the cathodic plate in a monopolar cell, or can be welded to a titanium plate for use in a bipolar configuration.

4 Claims, No Drawings

CATHODE MEMBER AND BIPOLAR PLATE FOR HYPOCHLORITE CELLS

CROSS-REFERENCE TO RELATED APPLICATION

This application is a continuation of PCT/EP2009/062509, filed Sep. 28, 2009, that claims the benefit of the priority date of U.S. Provisional Patent Application No. 61/101,246, filed on Sep. 30, 2008, the contents of which are herein incorporated by reference in their entirety.

FIELD

The invention relates to the field of electrochemical cells for electrolytic processes, in particular to electrochemical cells for the production of hypochlorite solutions.

BACKGROUND

The electrolytic production of hypochlorite solutions from sea water or diluted brine is a well-known electrochemical process. Electrochemically produced sodium or potassium hypochlorite produced in this way is used, for instance, as a bleaching agent. One of the most important applications for diluted hypochlorite solutions is in the field of water disinfection. The electrolysis process is usually carried out in monopolar or bipolar undivided cells with interleaved planar electrodes. Sea water, or a diluted brine at a typical chloride concentration of 15 to 40 grams/liter, is circulated in the electrolysis cell under a moderate current density to provide a hypochlorite solution at the anode at a typical concentration of 2 to 10 g/l.

Typical electrode materials of electrochemical hypochlorite cells are titanium or various types of steel for the hydrogen-evolving cathodes and titanium coated with noble metal-containing mixed oxide systems for the anodes. Titanium is particularly suitable for cells of bipolar configuration, wherein a bipolar plate can be obtained by coating one face of a titanium plate, to be used as the anodic face, with a suitable catalytic oxide mixture (for instance a mixture of ruthenium, iridium and titanium oxides), while the opposite, uncoated face is used as the cathodic one. One acknowledged problem with titanium or stainless steel cathode surfaces is that part of the hypochlorite product coming in contact therewith is reduced back to chloride, thereby lowering the efficiency of the process.

A similar problem is experienced in electrolysis cells for chlorate production, wherein chlorate produced at the anode also has the tendency of being partially reduced at the cathode. In the case of chlorate cells, this phenomenon is usually handled by filming the cathode with a chromium hydroxide film obtained by introducing sodium dichromate into the electrolytic bath. Such measure is not applicable, however, in hypochlorite systems for water disinfection, in which the presence of chromium is not acceptable.

Another solution that can be adopted in hypochlorite cells is to provide the titanium cathode surfaces with a titanium oxide plasma-sprayed intermediate layer, followed by a $ZrO_2$ plasma-sprayed layer. Another option is to plate a layer of platinum catalyst on the titanium cathode as the intermediate layer, again followed by a $ZrO_2$ plasma-sprayed layer. Zirconium oxide layers of suitable porosity can help prevent the anodic product from reaching the cathode active sites and have a beneficial effect on the overall current efficiency. Nevertheless, the operative lifetime of $ZrO_2$-coated titanium cathodes is normally too limited to justify the costs of a plasma spray application. In fact, although $ZrO_2$ is very stable to the caustic environment established on cathode surfaces, the cathodically-evolved hydrogen tends to detach the protective layer from the titanium body in a short time.

It is, therefore, highly desirable to identify a cathode material for use in electrochemical hypochlorite production which will allow a higher current efficiency with a suitable lifetime.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the invention comprises a zirconium oxide coated zirconium plate for use as a cathode member in an electrolytic cell for the production of hypochlorite.

To the accomplishment of the foregoing and related ends, the following description sets forth certain illustrative aspects and implementations. These are indicative of but a few of the various ways in which one or more aspects may be employed. Other aspects, advantages, and novel features of the disclosure will become apparent from the following detailed description.

DESCRIPTION

In the following description, for purposes of explanation, numerous specific details are set forth in order to provide a thorough understanding of the claimed subject matter. It may be evident, however, that the claimed subject matter may be practiced without these specific details.

One or more implementations of the invention are hereinafter illustrated and described. However, it will be appreciated by those skilled in the art that the invention is not limited to the exemplary implementations illustrated and described hereinafter.

In one embodiment, the invention relates to a cathode member of a monopolar or bipolar cell for hypochlorite production comprising a zirconium plate having a zirconium oxide layer on at least one of its surfaces. The term "zirconium plate" is defined herein as a generally planar element made of zirconium metal or of a suitable zirconium alloy, including a foraminous element such as a planar mesh, an expanded sheet or a punched sheet. The term "zirconium oxide layer" is defined herein as a layer containing zirconium oxide as a major component and optionally containing other species such as metals, oxides or compounds as minor components.

While titanium has always been the valve metal of choice for valve metal-based cathode plates of hypochlorite cells due to its lower cost and its superior resistance against corrosion, it has been found that zirconium oxide layers grown on zirconium surfaces are much more resistant to detachment induced by cathodically-evolved hydrogen compared to similar layers grown on titanium. A zirconium oxide layer can be applied to a zirconium plate, for example, by means of a thermal-spray technique, such as a plasma spray or a flame spray, much in the same way as for titanium plates, but obtaining a much higher lifetime in common operative conditions. In thermal-sprayed layers, zirconium oxide can be mixed with other suitable oxides to modify the structure of the layer, for instance to obtain an adequate porosity. Zirconium oxide modified with a small amount of $Y_2O_3$, usually less than 10% molar, is sometimes used on titanium plates and proves beneficial also on zirconium plates.

A zirconium oxide layer can be applied on a zirconium surface by thermal decomposition of a Zr-containing solution, for example, a salt solution which can be thermally converted to $ZrO_2$. This can have the advantage of offering an easier way for incorporating other oxides useful for controlling the porosity and the structure of the zirconium oxide layer in general. For instance, leachable oxides such as Al or Mo oxides, or surface-modifying oxides such as oxides of Ti, Ta, Nb or lanthanide elements, by including suitable precursors in the Zr-containing solution.

It has been found that a thermally grown $ZrO_2$ layer, obtained by subjecting a zirconium plate to a suitable thermal treatment in an oxygen-containing environment, for instance in air, provides surprisingly good performance in terms of prevention of hypochlorite back-reduction and operative lifetime. In one embodiment, a $ZrO_2$ layer is formed on a zirconium plate by heating the same in air at a temperature of 400° C. to 600° C. for 5 minutes to 6 hours.

While the application of a zirconium oxide layer via thermal-spray or thermal decomposition can be effected much in the same way to zirconium or to titanium plates, the formation of a thermally grown zirconium oxide is unique to zirconium plates. Besides the surprising performances obtained with thermally grown zirconium oxide layers, this methodology can have the advantage of being, at least in some cases, substantially cheaper and simpler compared to other types of application.

In another embodiment, a zirconium oxide layer is applied to a zirconium plate by means of an anodisation process. This methodology may be carried out directly in the electrolysis cell wherein the cathode member will be used by making the latter work under anodic potential for a sufficient time, for instance 5 to 120 minutes. Such anodisation of the zirconium plate may be carried out with the same brine used for hypochlorite production as the process electrolyte, or with a distinct specific electrolyte, optionally an acidic electrolyte.

A zirconium plate having a zirconium oxide layer on one or both of its surfaces can be used as a cathode plate in monopolar electrochemical cells for hypochlorite production, for instance in cells provided with catalyst-coated titanium plates as the anode plates. In one embodiment, the catalyst coating on the titanium anode plates comprises one or more noble metals and/or noble metal oxides thereof. In one embodiment, the titanium plate is coated with a titanium oxide layer, optionally a thermally grown oxide layer, and a catalyst layer containing one or more oxides of iridium or ruthenium is externally applied thereto.

A zirconium plate coated on one face with a zirconium oxide layer can also be coupled to a suitable anodic member, for instance a catalyst-coated titanium plate, to form a bipolar plate for bipolar-type electrochemical cells. In one embodiment, such coupling may be made by bonding the zirconium plate to the titanium plate back-to-back, e.g. with the uncoated faces contacting each other. The zirconium plate can be bonded to the titanium plate, for instance by welding, or by mechanical fastening, explosion bonding or other equivalent techniques. A bipolar plate for bipolar-type electrochemical cells can also be formed by plating one face of a zirconium plate with a sufficiently thick and compact titanium layer, for instance in a molten salt bath.

In one embodiment, a $ZrO_2$ layer is formed on a zirconium plate by heating the latter in air at a temperature of 400° C. to 600° C. for 5 minutes to 6 hours, and the resulting $ZrO_2$-coated zirconium plate is then welded or otherwise bonded to a titanium plate.

In another embodiment, a zirconium plate is bonded to a titanium plate and a bimetal plate having a zirconium face and a titanium face is obtained. The bimetal plate is then subjected to a thermal treatment in air at a temperature of 400° C. to 600° C. for 30 minutes to 6 hours. This can have the advantage of simultaneously growing a $ZrO_2$ layer on the zirconium face and a titanium oxide layer on the titanium face, which can serve as an anti-passivation layer. The titanium face provided in this way with an anti-passivation titanium oxide layer can be further provided with a suitable catalyst coating for hypochlorite production.

In another embodiment, a bimetal plate having a zirconium face and a titanium face is obtained by welding or otherwise bonding a zirconium plate to a titanium plate. A solution containing suitable catalyst precursors, for instance soluble salts of noble metals such as iridium or ruthenium and/or of other transition metals such as tantalum, niobium or titanium is applied to the titanium face in multiple coats, for instance 3 to 8 coats, and the bimetal plate is then subjected to a thermal treatment in air at a temperature of 400° C. to 600° C. for 2 to 10 minutes after each coat. This can have the advantage of providing the titanium face with a catalyst coating for hypochlorite production while simultaneously growing a $ZrO_2$ layer on the zirconium face.

In another embodiment, a bimetal plate having a zirconium face and a titanium face is obtained by welding or otherwise bonding a zirconium plate to a titanium plate. A solution containing suitable catalyst precursors, for instance, soluble salts of noble metals such as iridium or ruthenium and/or of other transition metals such as tantalum, niobium or titanium, is applied to the titanium face in multiple coats, for instance 3 to 8 coats, and the bimetal plate is then subjected to a thermal treatment in air at a temperature of 250° C. to 400° C. for 2 to 10 minutes after each coat, until a catalyst coating for hypochlorite production is obtained. A zirconium oxide layer is later grown on the zirconium face by subjecting the whole assembly to a thermal treatment in air at a temperature of 400° C. to 600° C. for 30 minutes to 4 hours. This can have the advantage of enabling the use of catalyst precursors which are suitably decomposed at lower temperatures giving rise to more conductive oxides, completing the formation of a suitable zirconium oxide layer only at a later stage.

In another embodiment, a titanium plate is coated by applying a solution containing catalyst precursors, for instance soluble salts of noble metals such as iridium or ruthenium and/or of other transition metals such as tantalum, niobium or titanium to one face thereof in multiple coats, followed by a thermal treatment in air at a temperature of 250° C. to 400° C. for 2 to 10 minutes after each coat. A zirconium plate is subsequently welded or otherwise bonded to the uncoated face, forming a bimetal plate with a zirconium face and a catalyst-coated titanium face. A zirconium oxide layer is later grown on the zirconium face by anodisation, imparting an anodic potential thereto in a convenient process electrolyte after optionally masking the coated titanium face. The process electrolyte may comprise the same brine used for hypochlorite production or may comprise a distinct, optionally acidic process electrolyte.

EXAMPLE 1

Three zirconium plates (samples 1, 2 and 3) of 300 mm length, 150 mm width and 5 mm thickness were grit-blasted with $Al_2O_3$ until obtaining an average surface roughness (Ra) of 6 to 7 micrometers, coated with a zirconium oxide layer and characterised as hydrogen-evolving cathodes in a lab cell for accelerated tests, in which hypochlorite production is carried out at more severe process conditions than in the usual industrial practice.

Sample 1 was coated by applying an aqueous solution of zirconium diacetate (20% in acetic acid), at a Zr concentration of 50 g/l, followed by thermal decomposition at 400° C. for one hour. The procedure was repeated for a total of four coats.

Sample 2 was subjected to a plasma-spraying of $ZrO_2$ modified with 8% of $Y_2O_3$ in a single pass, using a $N_2/H_2$ mixture as carrier, at 65 V and 500 A.

Sample 3 was baked for 1 hour at 500° C. in air, until a thermally grown $ZrO_2$ layer was obtained.

The above samples were characterised in a test cell equipped with a catalyst-coated titanium anode as the counterelectrode and operated at 2 kA/m². The test cell was fed with a sodium chloride brine having an inlet concentration of 30 g/l and an outlet concentration of 28.8 g/l, producing hypochlorite with an available chlorine concentration of 1.4 to 1.6 g/l. Current efficiency with respect to net hypochlorite production was determined for each sample in a separate beaker cell after pulling the samples from the test cell. This efficiency test was carried out on newly prepared samples and after 104 days on line, with NaCl brine at a concentration of 30 g/l, a temperature of 15-16° C. and with a theoretical hypochlorite concentration of 5.95 g/l.

Sample 1 showed an initial current efficiency of 93.0% and a current efficiency of 88.4% after 104 days of continuous operation.

Sample 2 showed an initial current efficiency of 87.2% and a current efficiency of 91.3% after 104 days of continuous operation.

Sample 3 showed an initial current efficiency of 93.4% and a current efficiency of 90.0% after 104 days of continuous operation.

COUNTEREXAMPLE 1

Three titanium plates (samples 0, 1C and 2C) of 300 mm length, 150 mm width and 5 mm thickness were grit-blasted with $Al_2O_3$ until obtaining an average surface roughness (Ra) of 6 to 7 micrometers. Sample 0 was left uncoated and samples 1C and 2C were coated with a zirconium oxide layer.

Sample 1C was subjected to a plasma-spraying of $TiO_x$ in a single pass, using an $Ar/H_2$ mixture as carrier, at 65 V and 500 A, followed by a plasma-spraying of $ZrO_2$ modified with 8% of $Y_2O_3$ in a single pass, using a $N_2/H_2$ mixture as carrier, at 65 V and 500 A.

Sample 2C was plated with a 0.5 micrometer thick Pt metal layer and subjected to a plasma-spraying of $ZrO_2$ modified with 8% of $Y_2O_3$ in a single pass, using a $N_2/H_2$ mixture as carrier, at 65 V and 500 A.

All samples were characterised as hydrogen-evolving cathodes in the test cell and in the separate beaker cell of example 1 at identical process conditions.

Sample 0 showed an initial current efficiency of 78.4% and a current efficiency of 72.5% after 104 days of continuous operation.

Sample 1C showed an initial current efficiency of 89.3% and failed after 44 days of continuous operation, forcing the operators to shut-down the process.

Sample 2C showed an initial current efficiency of 91.8% and failed after 74 days of continuous operation, forcing the operators to shut-down the process.

EXAMPLE 2

Five zirconium plates of 300 mm length, 150 mm width and 5 mm thickness were welded to five titanium plates of the same size. The five resulting bimetal plates were grit-blasted with $Al_2O_3$ until obtaining an average surface roughness (Ra) of 6 to 7 micrometers on both faces, and subjected to a thermal treatment in an oven with forced air circulation at 450° C. for 1 hour. The titanium faces of each bimetal plate were then coated with a catalyst layer containing the oxides of ruthenium, iridium and titanium in four coats by spraying a precursor solution containing the chlorides of the three metals followed by a thermal decomposition at 475° C. for 1 hour in the same oven.

The five plates were assembled in a lab bipolar cell for hypochlorite production of the interleaved plate-type design, with the titanium face working as anode and the zirconium face working as cathode. The cell was operated for 190 days at a current density of 2 kA/m² with a sodium chloride brine feed having an inlet concentration of 30 g/l and an outlet concentration of 24 g/l, producing hypochlorite with an available chlorine concentration of 7 to 8 g/l. During the testing period, the overall current efficiency ranged between 88.5 and 92.7%.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

The discussion of documents, acts, materials, devices, articles and the like is included in this specification solely for the purpose of providing a context for the invention. It is not suggested or represented that any or all of these matters formed part of the prior art base or were common general knowledge in the field relevant to the invention before the priority date of each claim of this application.

The invention claimed is:

1. A method for manufacturing a bipolar plate of an electrochemical cell for hypochlorite production, comprising:
   bonding a zirconium plate to a titanium plate thereby obtaining a bimetal plate having a zirconium face and a titanium face;
   subjecting the bimetal plate to a thermal treatment in air at a temperature of 400° C. to 600° C. for 30 minutes to 6 hours, thereby simultaneously obtaining a zirconium oxide layer on the zirconium face and a titanium oxide layer on the titanium face.

2. A method for manufacturing a bipolar plate of an electrochemical cell for hypochlorite production, comprising:
   welding a zirconium plate to a titanium plate thereby obtaining a bimetal plate having a zirconium face and a titanium face;
   optionally subjecting said bimetal plate to a thermal treatment in air at a temperature of 400 to 600° C. for 30 minutes to 6 hours;
   applying a noble metal-containing solution to the titanium face in multiple coats, each followed by a thermal treatment in air at a temperature of 400 to 600° C. for 2 to 10 minutes, thereby obtaining a zirconium oxide layer on the zirconium face and a noble metal oxide layer on the titanium face.

3. A method for manufacturing a bipolar plate of an electrochemical cell for hypochlorite production comprising:
welding a zirconium plate to a titanium plate, thereby obtaining a bimetal plate having a zirconium face and a titanium face;
applying a noble metal-containing solution to said titanium face in multiple coats, each followed by a thermal treatment in air at a temperature of 250 to 400° C. for 2 to 10 minutes, thereby obtaining a noble metal oxide layer on the titanium face;
subjecting the bimetal plate to a final thermal treatment in air at a temperature of 400° C. to 600° C. for 30 minutes to 4 hours, thereby obtaining a zirconium oxide layer on the zirconium face.

4. A method for manufacturing a bipolar plate of an electrochemical cell for hypochlorite production, comprising:
applying a noble metal-containing solution to one face of a titanium plate in multiple coats, each followed by a thermal treatment in air at a temperature of 250 to 400° C. for 2 to 10 minutes, thereby obtaining a titanium plate with a catalyst-coated surface;
bonding a zirconium plate to the uncoated surface of the titanium plate, thereby obtaining a bimetal plate having a zirconium face and a catalyst-coated titanium face;
optionally, masking said catalyst-coated titanium face;
exposing the bimetal plate to a process electrolyte and subjecting the zirconium face to an anodic potential until obtaining a zirconium oxide layer on the zirconium face.

* * * * *